Aug. 12, 1941.   C. M. YODER   2,251,967
MACHINE FOR AND PROCESS OF FORMING STRUCTURAL MEMBERS
Filed Aug. 5, 1936   16 Sheets-Sheet 1
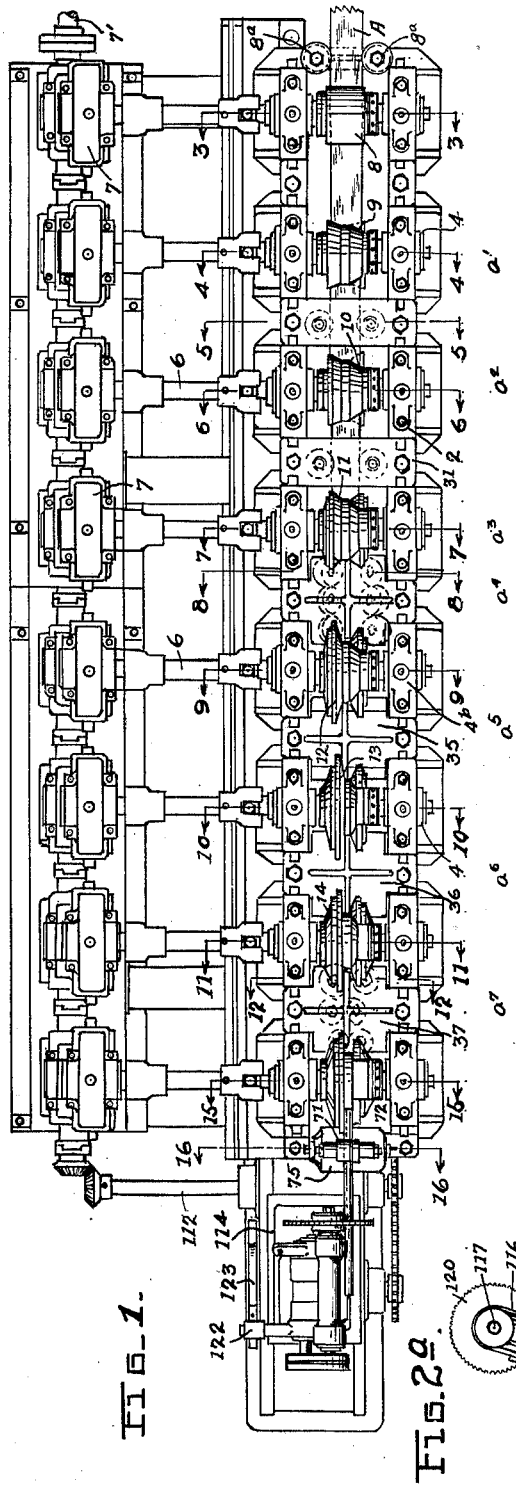
INVENTOR
CARL M. YODER
BY
*Geo. B. Pitts*
ATTORNEY Aug. 12, 1941.  C. M. YODER  2,251,967
MACHINE FOR AND PROCESS OF FORMING STRUCTURAL MEMBERS
Filed Aug. 5, 1936  16 Sheets—Sheet 2
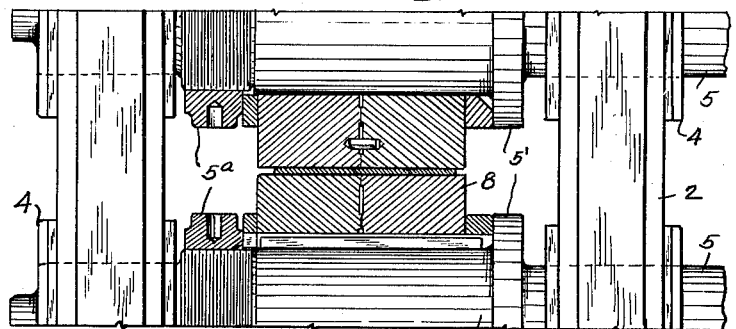
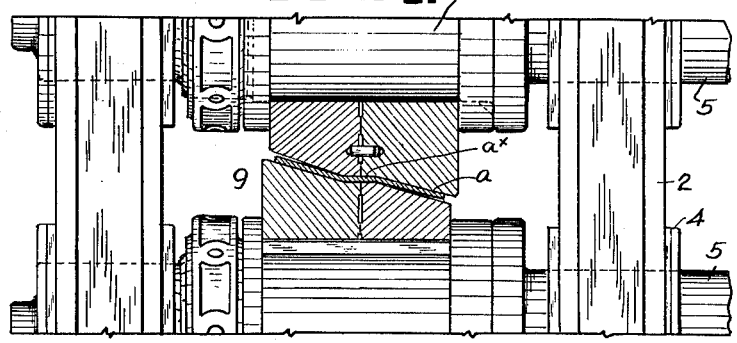
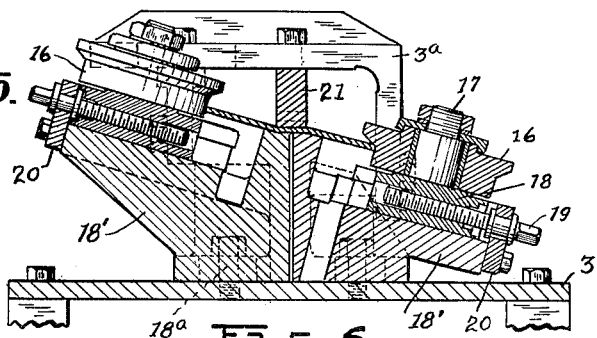
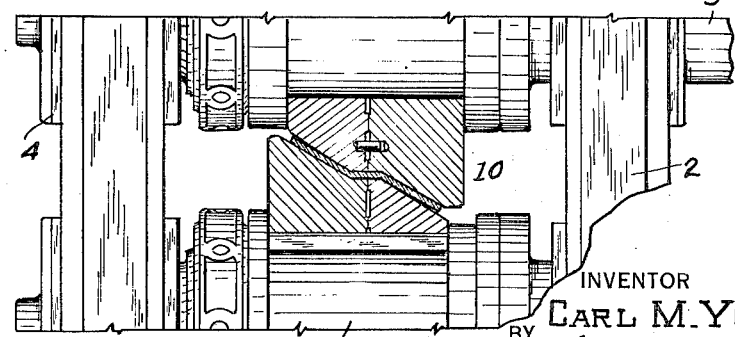
INVENTOR
CARL M. YODER.
BY
ATTORNEY Aug. 12, 1941.   C. M. YODER   2,251,967
MACHINE FOR AND PROCESS OF FORMING STRUCTURAL MEMBERS
Filed Aug. 5, 1936   16 Sheets-Sheet 3
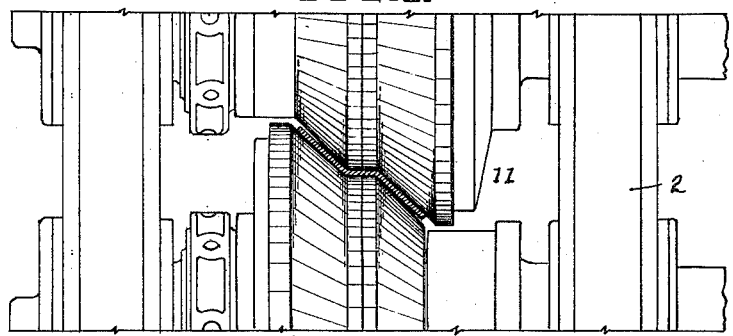
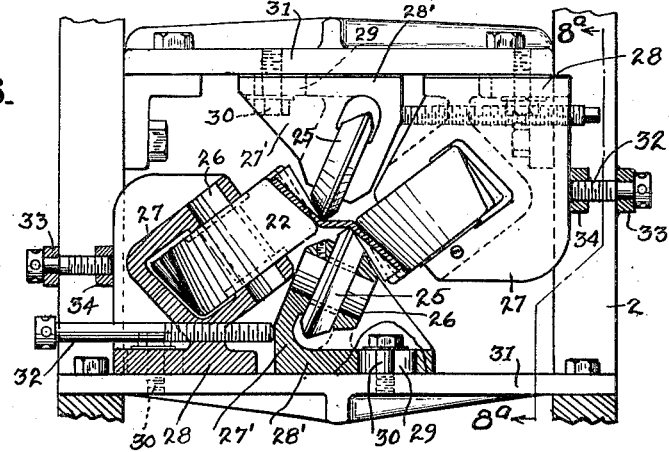
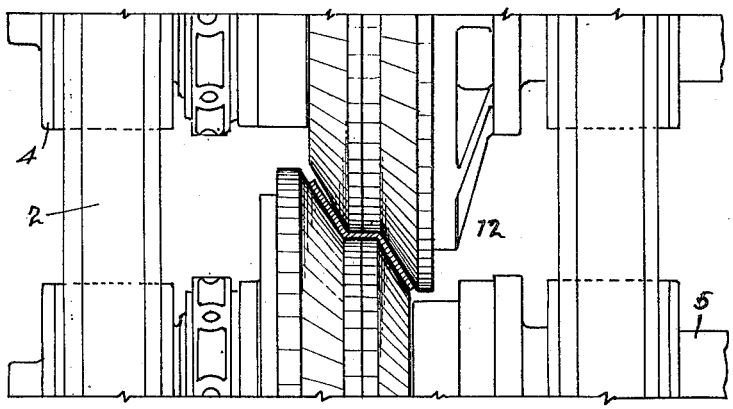
INVENTOR
CARL M. YODER
BY Geo. B. Pitts
ATTORNEY Aug. 12, 1941.  C. M. YODER  2,251,967
MACHINE FOR AND PROCESS OF FORMING STRUCTURAL MEMBERS
Filed Aug. 5, 1936  16 Sheets-Sheet 4
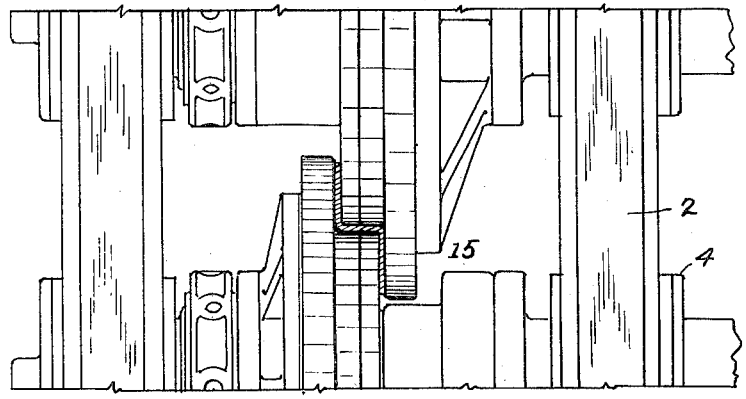
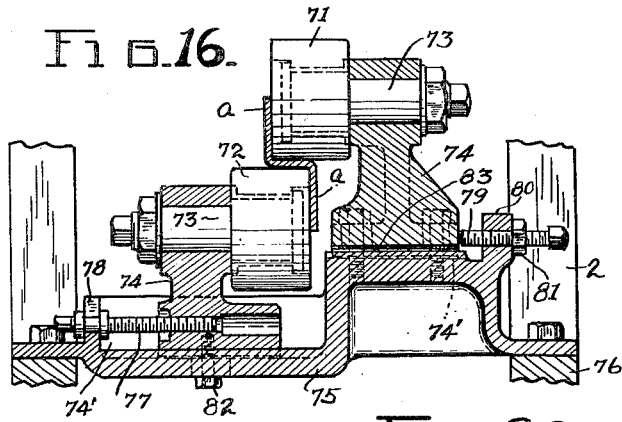
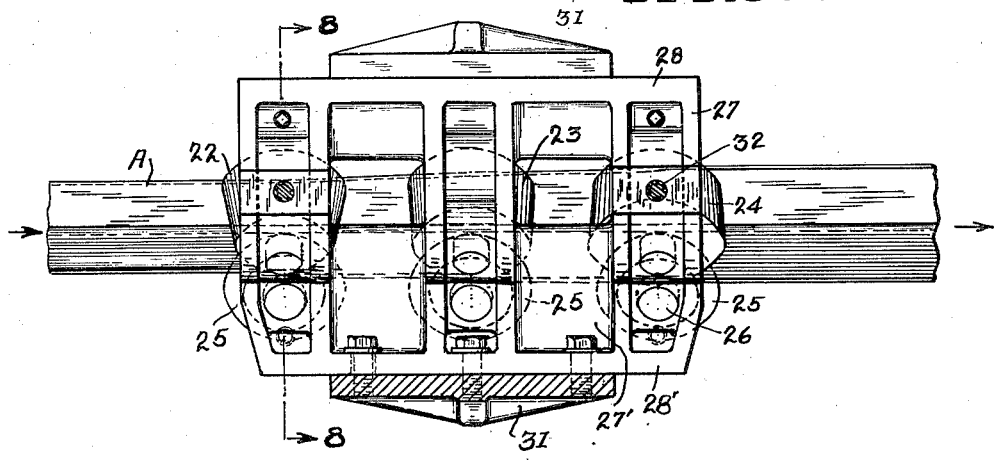
INVENTOR
BY CARL M. YODER
ATTORNEY Aug. 12, 1941.    C. M. YODER    2,251,967
MACHINE FOR AND PROCESS OF FORMING STRUCTURAL MEMBERS
Filed Aug. 5, 1936    16 Sheets-Sheet 5
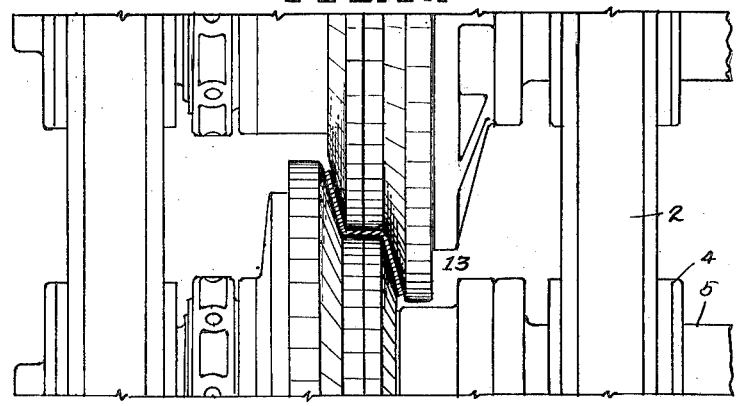
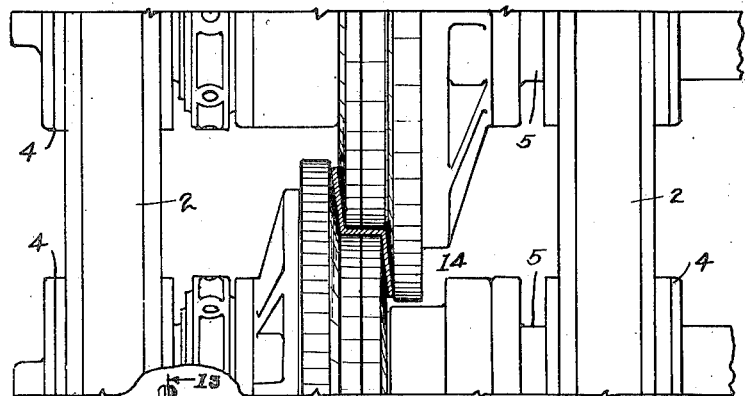
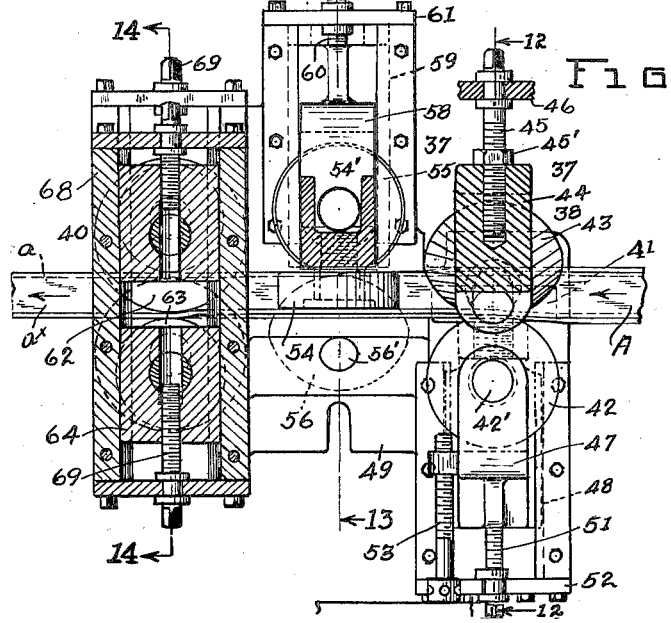
INVENTOR
BY CARL M. YODER.
ATTORNEY

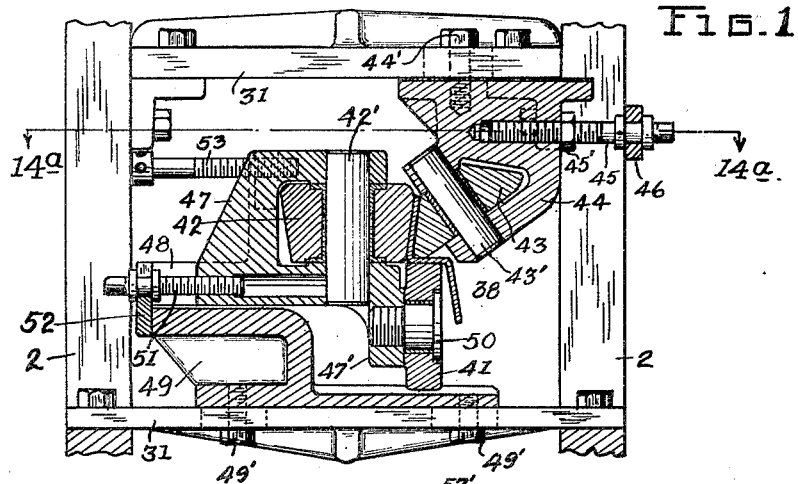
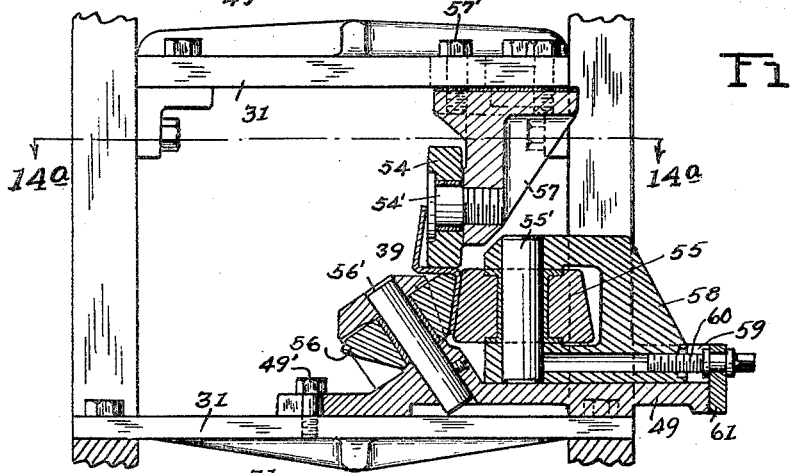
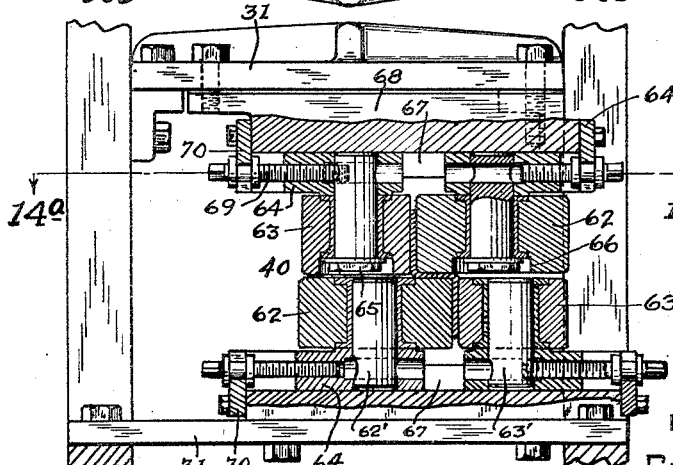

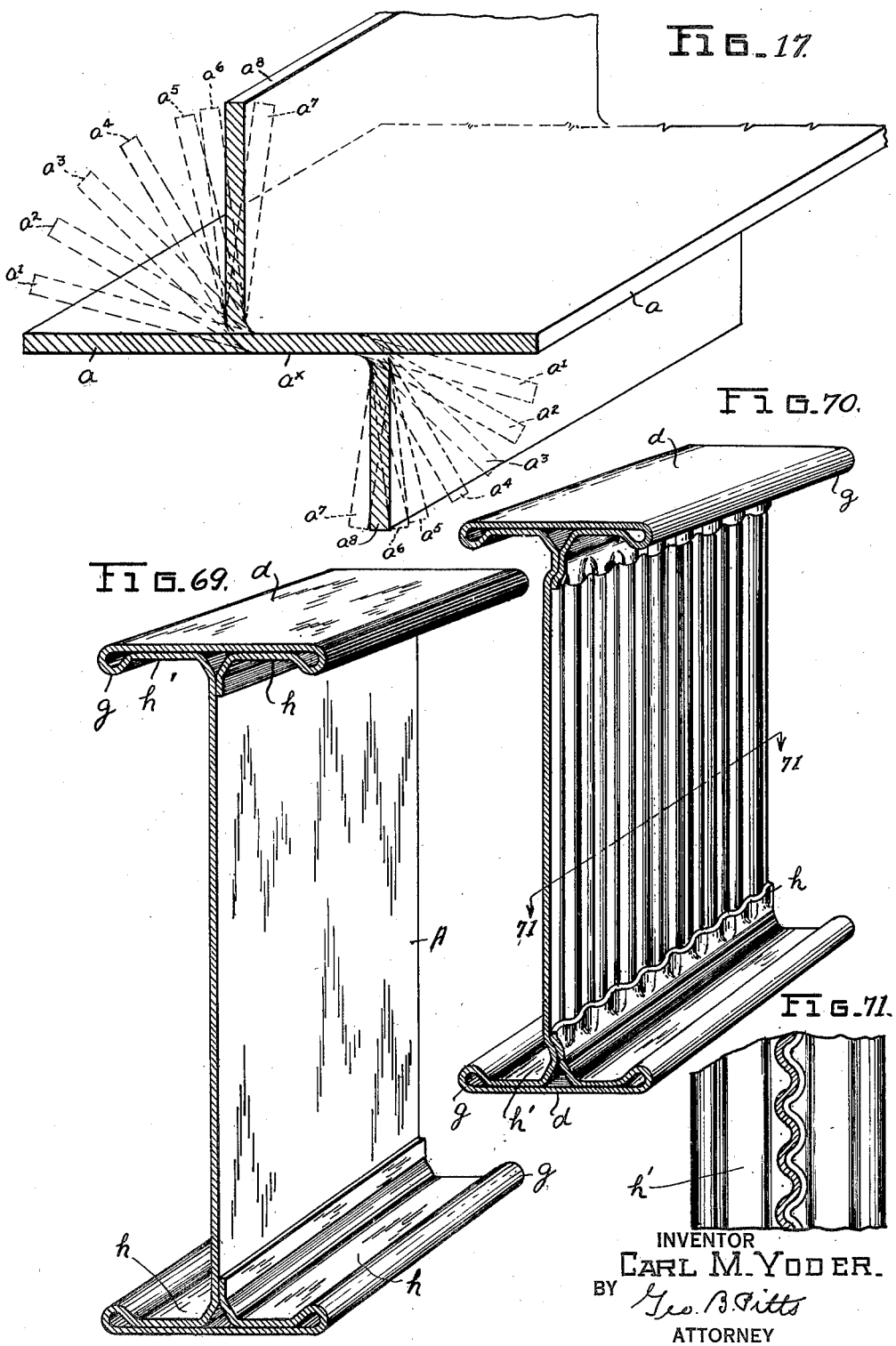

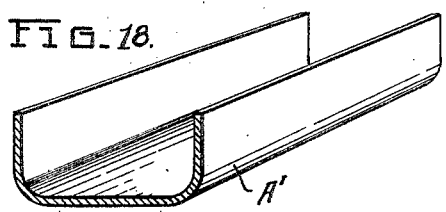
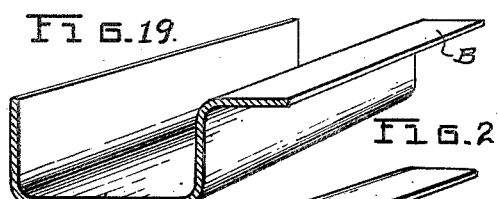
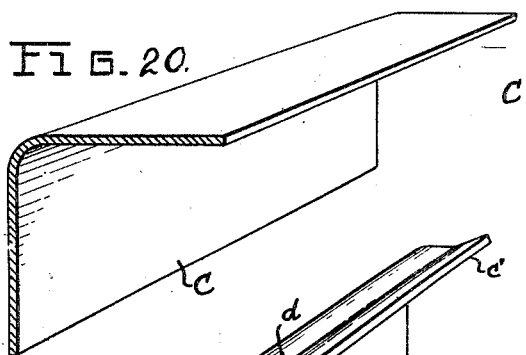
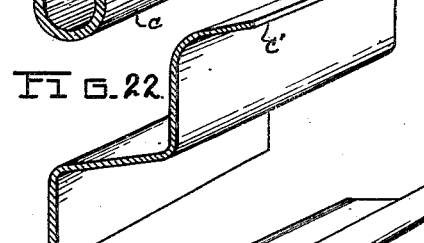
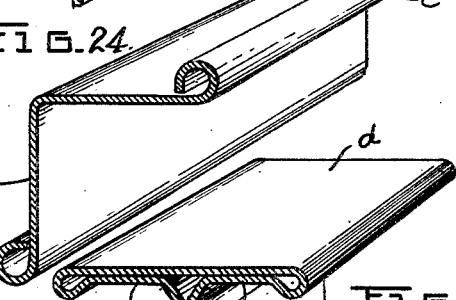
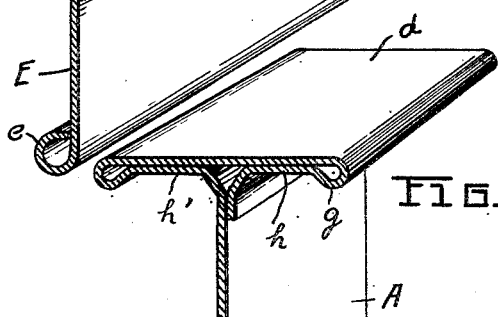
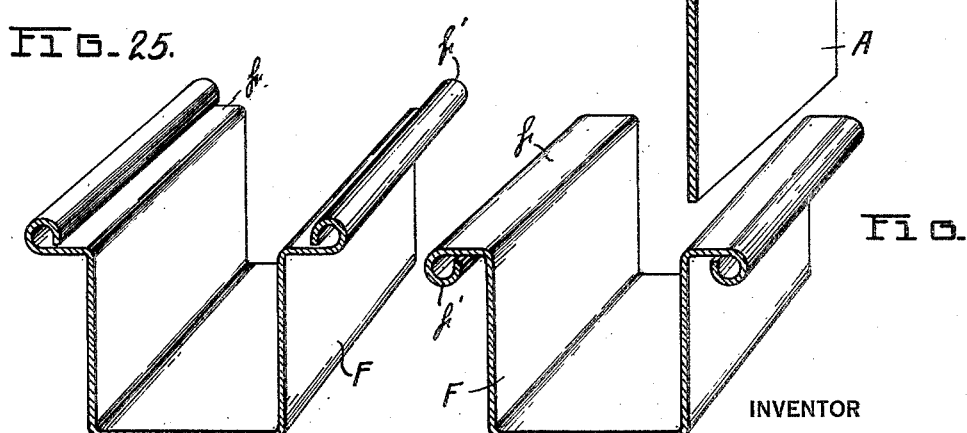
INVENTOR
BY CARL M. YODER
ATTORNEY

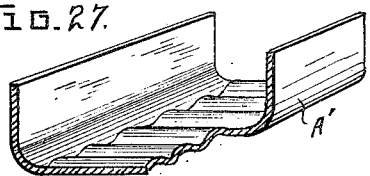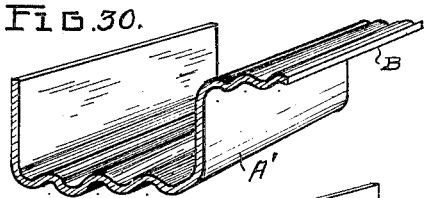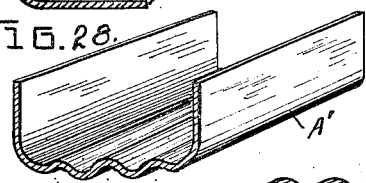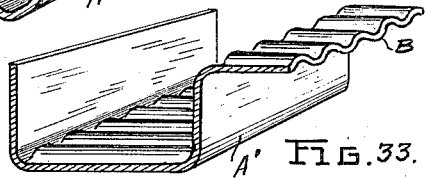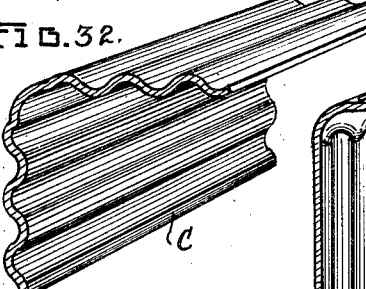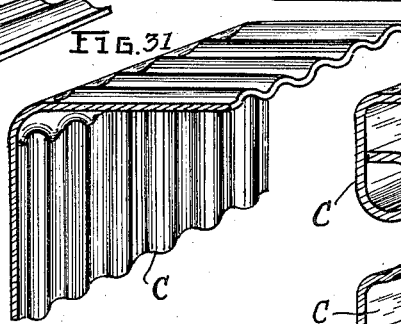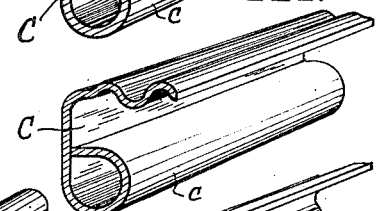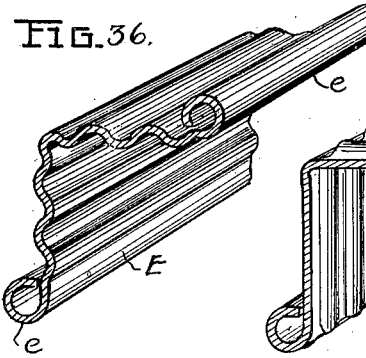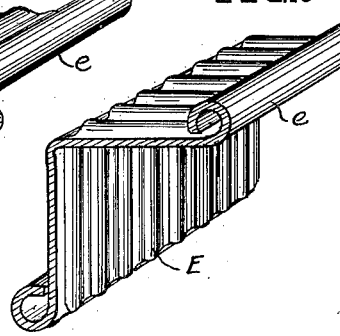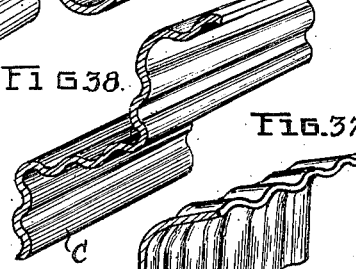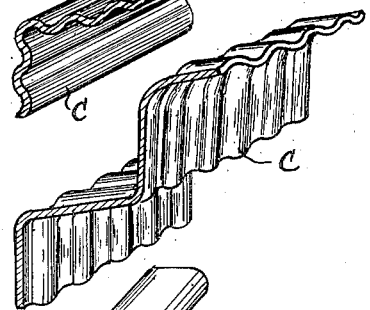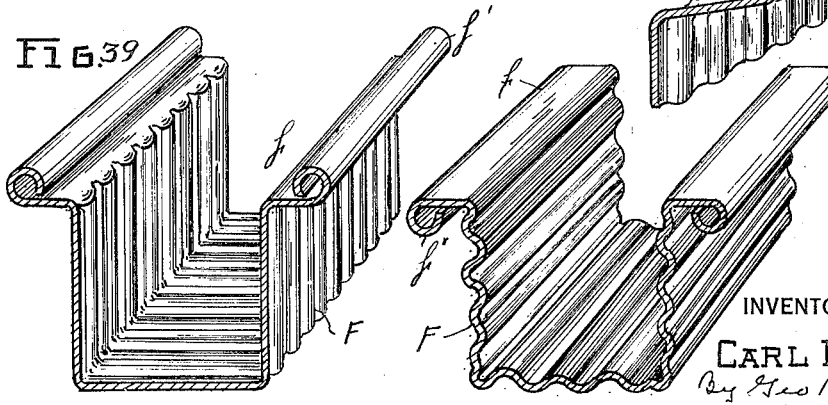

Aug. 12, 1941.   C. M. YODER   2,251,967
MACHINE FOR AND PROCESS OF FORMING STRUCTURAL MEMBERS
Filed Aug. 5, 1936   16 Sheets—Sheet 10
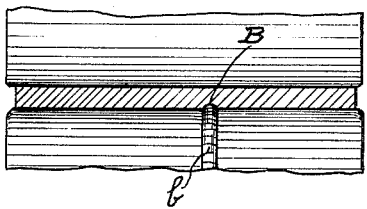
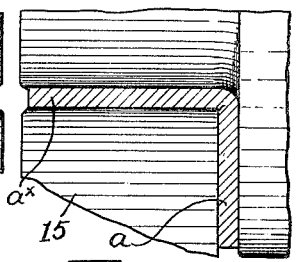
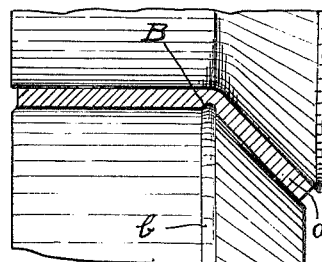
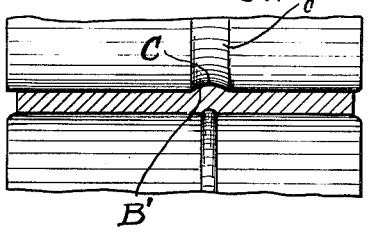
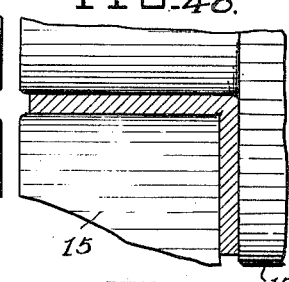
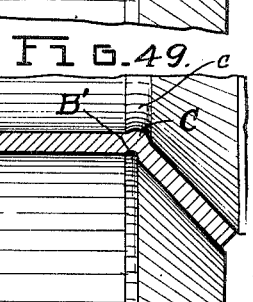
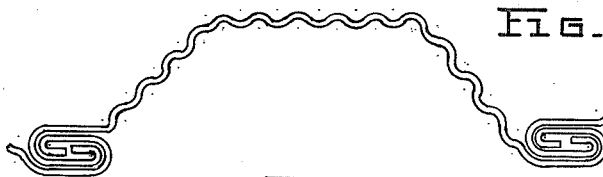
INVENTOR
CARL M. YODER.
BY
ATTORNEY Aug. 12, 1941.  C. M. YODER  2,251,967
MACHINE FOR AND PROCESS OF FORMING STRUCTURAL MEMBERS
Filed Aug. 5, 1936  16 Sheets-Sheet 11
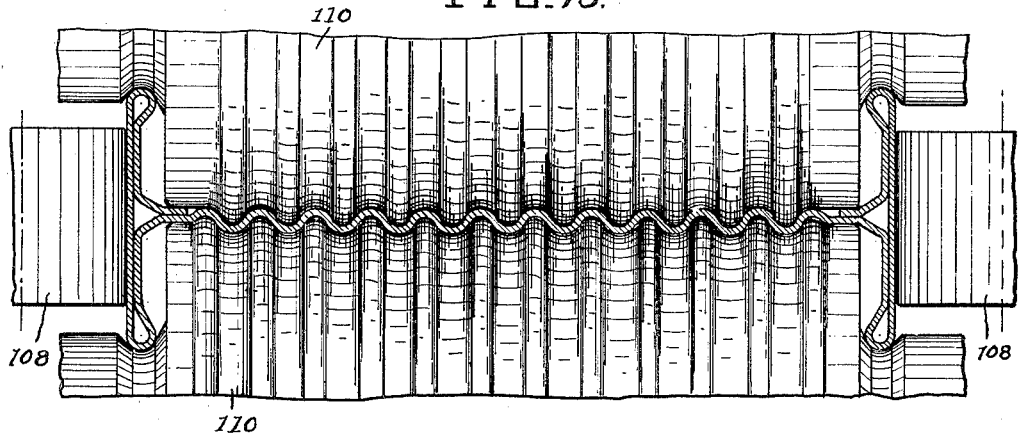
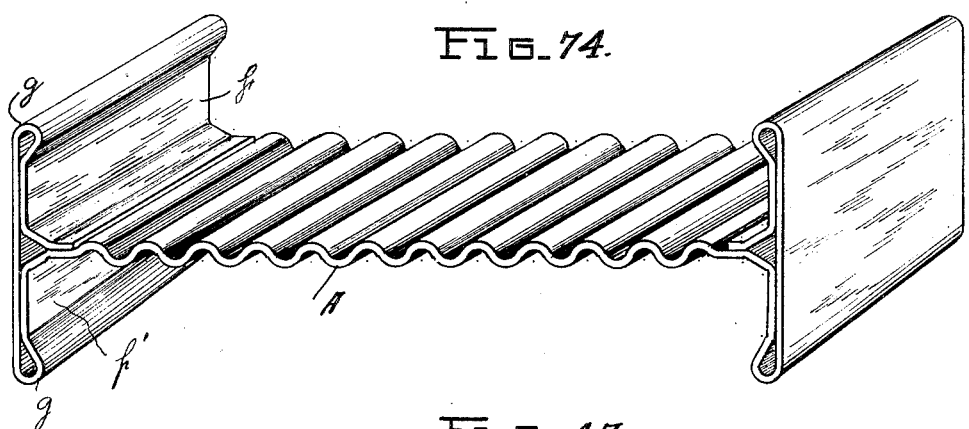
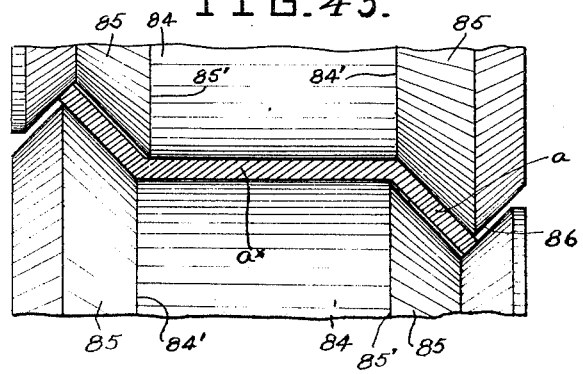
INVENTOR
CARL M. YODER.
BY
ATTORNEY Aug. 12, 1941.  C. M. YODER  2,251,967
MACHINE FOR AND PROCESS OF FORMING STRUCTURAL MEMBERS
Filed Aug. 5, 1936  16 Sheets-Sheet 13
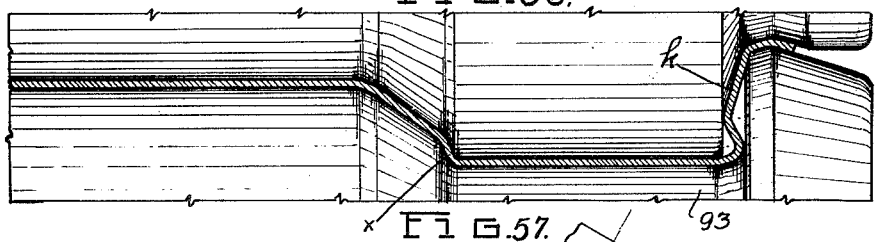
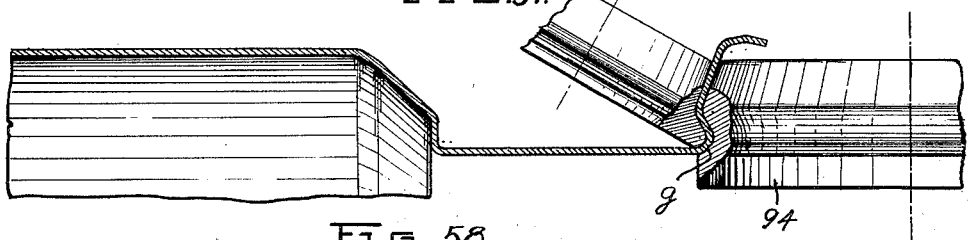
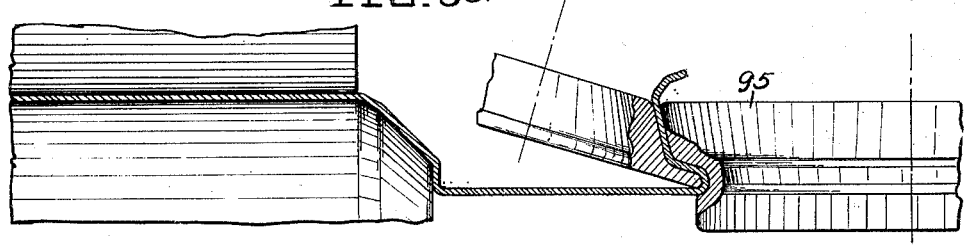
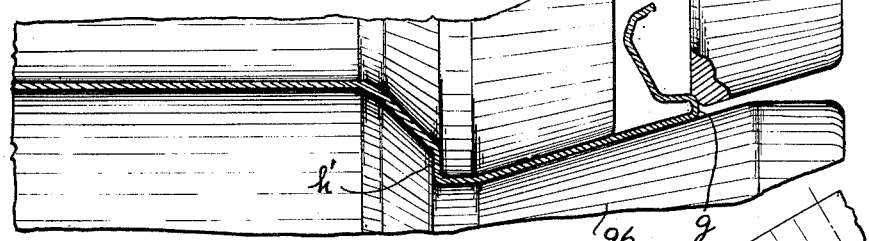
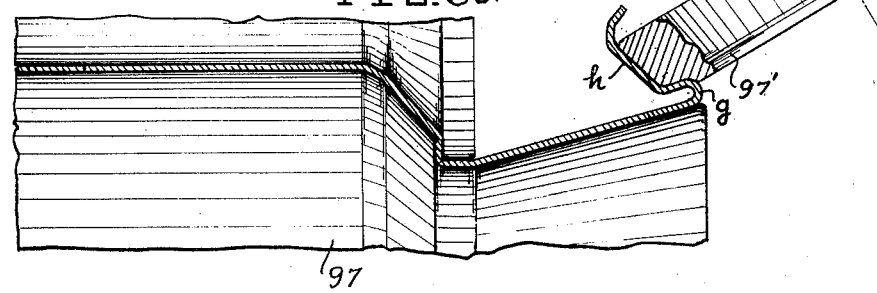
INVENTOR
BY CARL M. YODER
ATTORNEY Aug. 12, 1941.　　　C. M. YODER　　　2,251,967
MACHINE FOR AND PROCESS OF FORMING STRUCTURAL MEMBERS
Filed Aug. 5, 1936　　16 Sheets—Sheet 16

INVENTOR
CARL M. YODER
BY Geo. B. Pitts
ATTORNEY

UNITED STATES PATENT OFFICE 2,251,967

MACHINE FOR AND PROCESS OF FORMING STRUCTURAL MEMBERS

Carl M. Yoder, Lakewood, Ohio

Application August 5, 1936, Serial No. 94,404

7 Claims. (Cl. 153—28)

This invention relates to a machine for and process of forming structural shapes or members, more particularly the invention relates to the forming of structural members for various uses from sheet material, for example, sheet metal or sheet steel, whereby cost of manufacture is reduced, and also, when desired, reinforcing such members longitudinally or transversely, dependent upon the intended use of the members; such members being adapted for use instead of rolled-out billets, whereby a predetermined structural strength may be attained, but the weight of the members is materially reduced to facilitate their transportation and handling. One advantage of the invention resides in the fact that either hot or cold rolled sheet metal or sheet steel may be employed and that the members may be formed in a continuous rapid manner from stock supplied in straight form or from a coil thereof. Another advantage of the invention resides in the fact that the produced members are of uniform cross sectional shape irrespective of variations in the thickness and molecular structure of the stock being shaped.

One object of the invention is to provide an improved machine having a plurality of sets of removable rolls for continuously forming sheet stock into various cross sectional shapes, the roll sets co-operating to bend sections of the material to an abnormal position and to then re-bend the sections to their final position to insure uniformity and permanent predetermined cross sectional shape throughout the length of the stock, whereby structural members of relatively light weight, while maintaining a predetermined strength, may be produced.

Another object of the invention is to provide an improved machine of this character which may be operated in a rapid manner to continuously form sheet material into predetermined cross sectional shapes.

Another object of the invention is to provide an improved machine for forming and reinforcing structural members from sheet material of any predetermined cross sectional shape, whereby relatively light gauge stock may be used while insuring maximum strength.

Another object of the invention is to provide an improved process for forming or shaping sheet metal or sheet steel into predetermined shapes for application as supports, studding and other purposes.

A further object of the invention consists in so manipulating the sheet stock during forming thereof that it may be readily formed into its final predetermined shape, uniformity is insured and danger of distortion of the resulting member due to handling is entirely avoided.

A still further object of the invention is to provide an improved structural member formed of metallic sheet stock and reinforced longitudinally or transversely when desired and according to the intended use thereof.

Other objects of the invention will be apparent to those skilled in the art to which my invention relates from the following description taken in connection with the accompanying drawings, wherein Fig. 1 is a plan view of a machine embodying my invention and capable of carrying out the steps of my process.

Fig. 2 is a side elevation.

Fig. 2a is a fragmentary elevational view looking towards the right on the line 2a—2a of Fig. 2.

Figs. 3, 4, 5, 6 and 7 are fragmentary sections on the lines 3—3, 4—4, 5—5, 6—6, and 7—7, respectively, of Fig. 1.

Fig. 8 is a section on the line 8—8 of Figs. 1 and 8a.

Fig. 8a is a section on the line 8a—8a of Fig. 8, parts being omitted to facilitate the illustration.

Figs. 9, 10, and 11 are sections on the lines 9—9, 10—10 and 11—11, respectively, of Fig. 1.

Fig. 12 is a section on the line 12—12 of Figs. 1 and 14a.

Figs. 13 and 14 are sections on the lines 13—13 and 14—14, respectively, of Fig. 14a showing other rolls associated with the rolls shown in Fig. 12.

Fig. 14a is a fragmentary view, partly in plan and partly in section on the line 14a—13a of Figs. 12, 13 and 14, showing the group of rolls shown in these latter views.

Figs. 15 and 16 are sections on the lines 15—15 and 16—16, respectively, of Fig. 1.

Fig. 17 is a perspective view showing diagrammatically the steps of forming a structural member as shaped by the mechanism shown in Figs. 1 to 16, inclusive.

Figs. 18 to 26, inclusive, show in perspective differently cross-sectionally shaped members capable of being formed by the machine shown in Figs. 1 to 16, inclusive, and according to the steps of my process.

Figs. 27 to 40, inclusive, show in perspective members similar to those shown in Figs. 18 to 26, but in which they are reinforced transversely and longitudinally.

Fig. 41 is an elevational view of a plurality of members in interlocked relation, applied as piles, parts being broken away.

Fig. 42 is a plan view of the parts shown in Fig. 41.

Fig. 43 shows the step of providing the member with sharp corners.

Figs. 44 and 45 show a modified form of mechanism for forming the member with sharp corners on its inner side.

Fig. 46 is a view showing the step of grooving the stock during the shaping thereof.

Figs. 47, 48 and 49 are views similar to Figs. 44, 45 and 46, respectively, wherein the member is provided with sharp corners on both its inner and outer sides.

Figs. 50 to 68, inclusive, are fragmentary sections through roll passes and the successive steps of forming an I-member.

Fig. 69 is a perspective view of an I-member.

Fig. 69a is a perspective view of a T-member.

Fig. 70 is a perspective view of an I-member having a transversely reinforced web.

Fig. 71 is a fragmentary section on the line 71—71 of Fig. 70.

Figure 50:
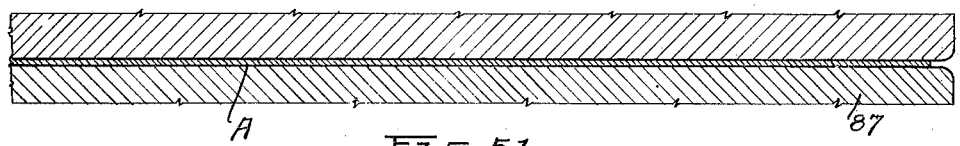
Figure 51:
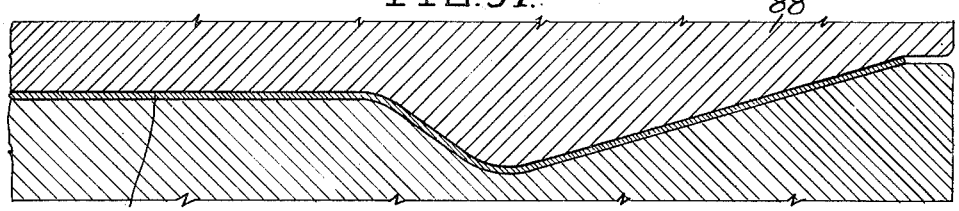
Figure 52:
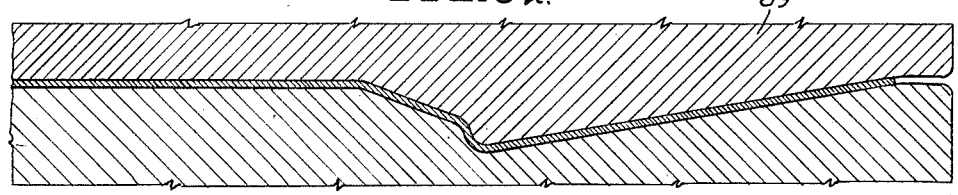
Figure 53:
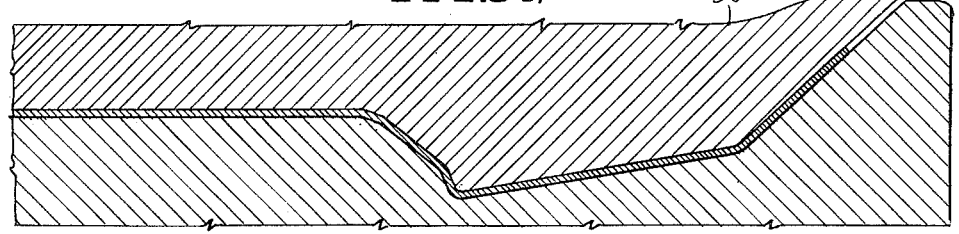
Figure 54:
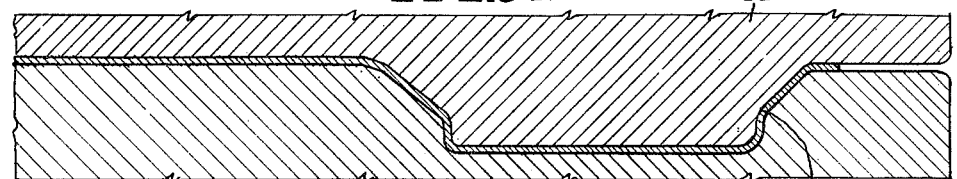
Figure 55:
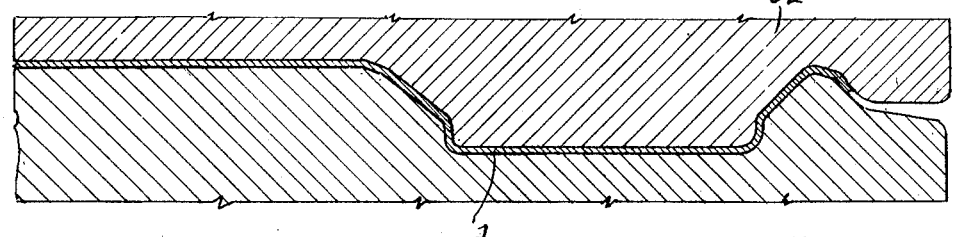
Figure 61:
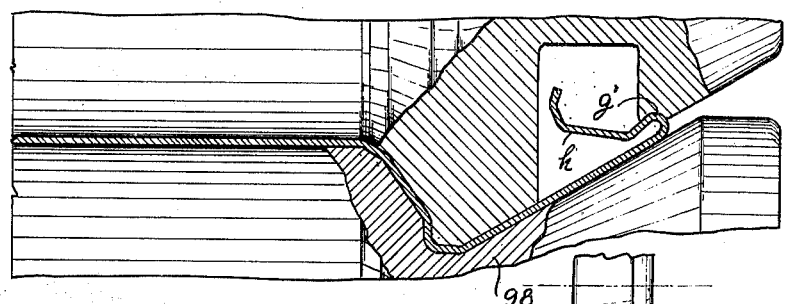
Figure 62:
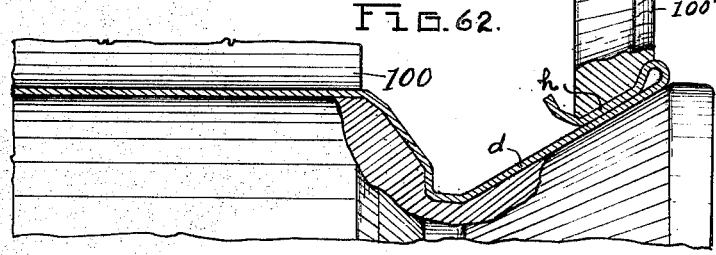
Figure 63:
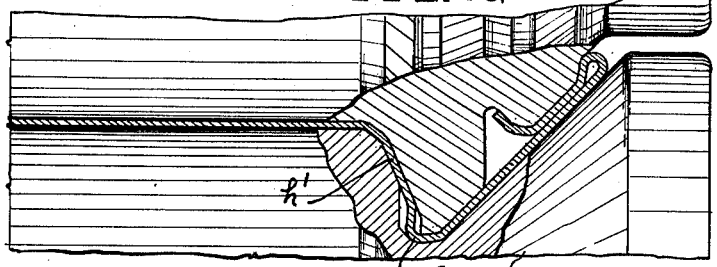
Figure 64:
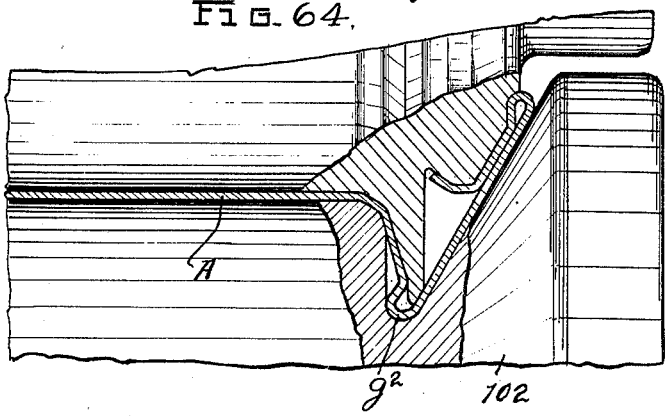
Figure 65:
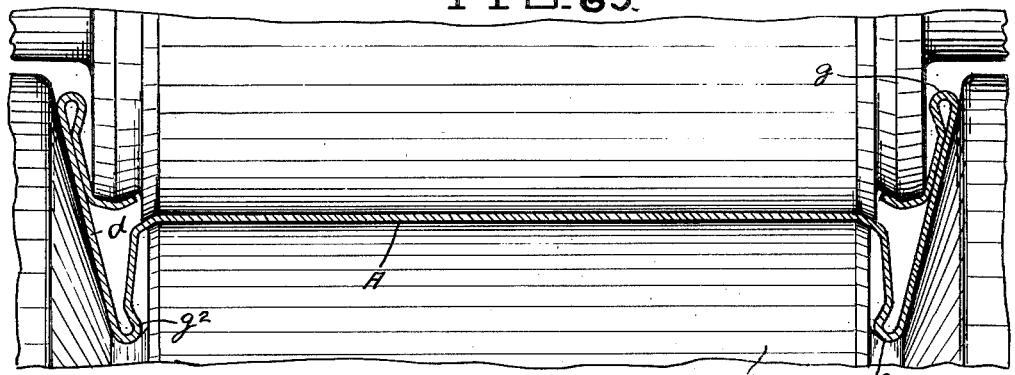
Figure 68:
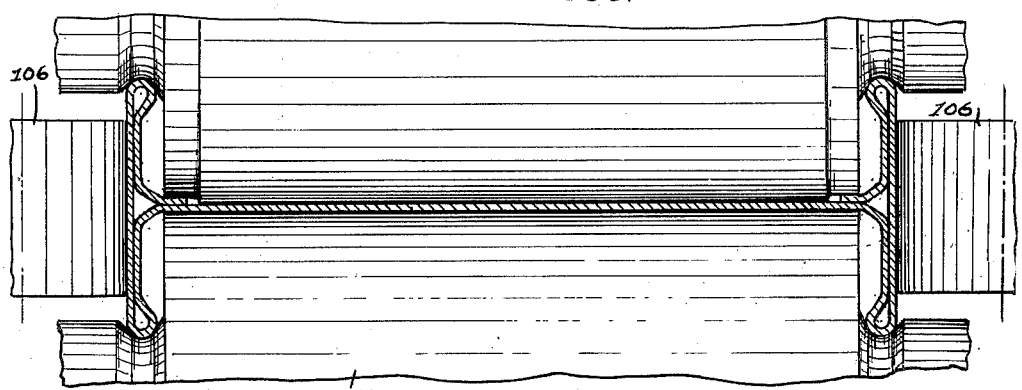
Figure 72:
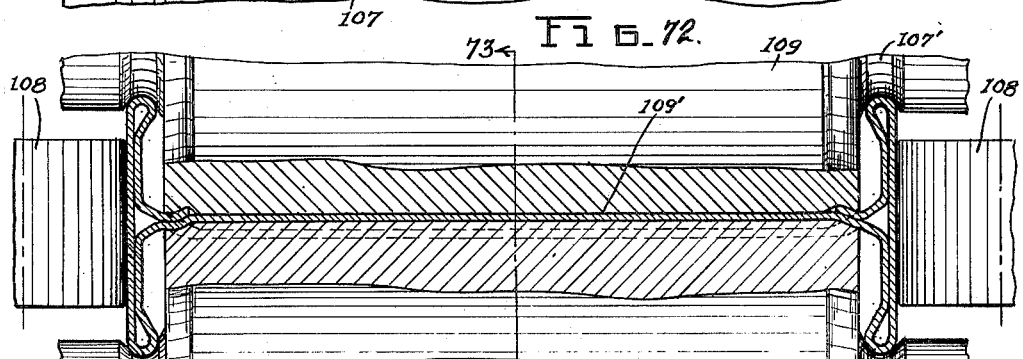

Fig. 72 is a fragmentary section showing the mechanism for reinforcing an I-member as shown in Fig. 70.

Figure 73:
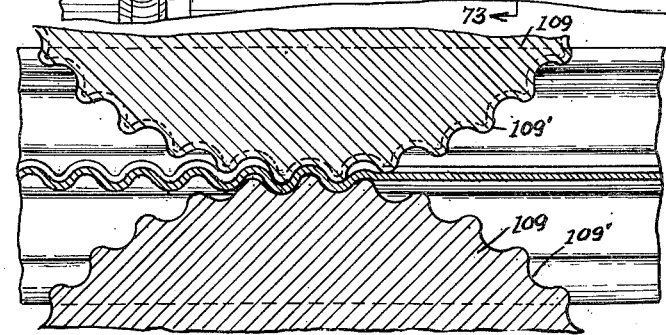
Figure 66:
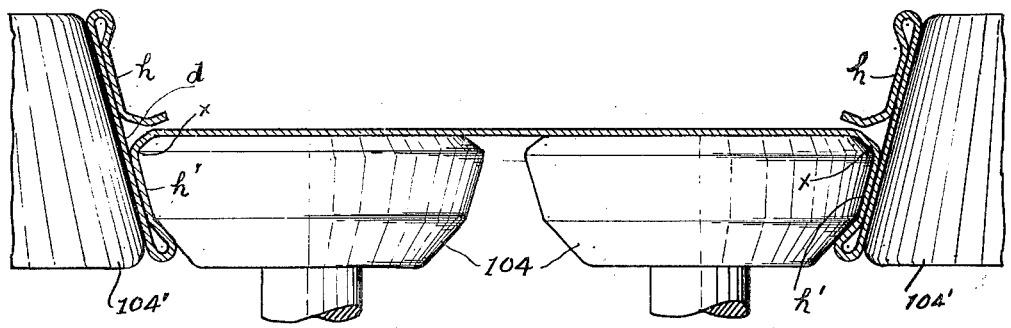
Figure 67:
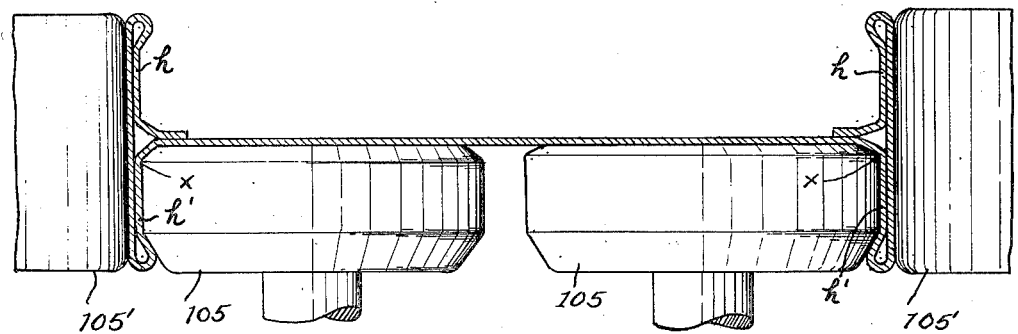

Fig. 73 is a section on the line 73—73 of Fig. 72.

Fig. 74 is a perspective view of an I-member having a longitudinally reinforced web.

Fig. 75 is a fragmentary section showing the mechanism for reinforcing an I-member as shown in Fig. 74.

Referring to Figs. 1 to 17, 1 indicates a support on which are mounted spaced pairs of standards 2 and supporting elements mounted between certain of the pairs of standards, as will later appear. The standards 2 support journal boxes 4 of suitable construction (preferably provided with anti-friction bearings) for supporting the opposite ends of upper and lower shafts 5.

The upper boxes are adjustably supported on or relative to the lower boxes by means of screws 4', whereby the upper boxes may be adjusted vertically. The upper boxes are clamped in position by screws 4a threaded through bridge members 4b. Each shaft 5 of each pass is driven by a shaft 6 drivingly connected to the shaft 6 of the adjacent shaft 5, the latter shaft being driven through suitable gearing in a casing 7 to a drive shaft 7', which in turn is driven by a motor (not shown); but if desired, the driven shaft 6 for each pass may be driven by a separate motor. The shafts 5 mounted in the first pair of standards 2 are provided with feed rolls 8, to which is delivered by guide rolls 8a sheet stock of the desired thickness and width, whereas the shafts 5 mounted in the remaining pairs of standards are provided with related rolls to form main passes 9, 10, 11, 12, 13, 14 and 15. The supporting elements (later referred to) support intermediate groups of co-operating idler rolls which co-operate with certain of the relathed rolls constituting the main passes, as the stock A is fed forwardly, to guide and/or shape it preparatory to the feed of the stock to the succeeding passes, respectively, the rolls of the main and intermediate passes being shaped and arranged to form a Z-member, as shown in Figs. 15 and 16, as illustrating one form of construction and the process embodying my invention.

The shafts 5 are removable and the rolls thereon are also removable, whereby sets of rolls dependent upon the final predetermined cross sectional shape of the stock, may be provided upon the shafts 5. Likewise, the number of main roll passes and intermediate groups of rolls may be increased or decreased according to the size and final predetermined cross sectional shape of the stock to be produced. As shown in Fig. 3, the roll on each shaft 5 is mounted between a collar 5' and a clamping nut 5a, spacers being provided between the roll and these parts to insure alinement with the remaining sets and groups of rolls.

In the first main pass 9 (Fig. 4) the lateral sections $a, a$, of the stock are bent on longitudinal lines in opposite directions relative to its central section $a^x$, as shown at $a'$ (see Fig. 17) and such sections then pass to and between the intermediate idler rolls 16 mounted between the passes 9 and 10. Each roll 16 is loosely mounted on a shaft 17 fixed to a base 18, which is slidably mounted in a block 18', the latter being adjustably secured to the adjacent supporting element 3. Each base 18 is formed with a threaded opening to receive a screw 19 suitably mounted in an end wall 20, so that by turning the screw the base 18 may be adjusted transversely to the direction of feed of the stock, to position the idler roll in position to engage the edge thereof, so that the roll 16 and the opposed roll 16 may guide the stock to the second pass 10. The blocks 18' for the rolls 16 support a frame 3a from which depends a guide element 21 arranged to co-operate with opposed portions of the blocks to guide the central section $a^x$ of the stock. The blocks 18' are secured to the adjacent supporting element by bolts 18a, which extend through elongated openings to permit transverse adjustment of the blocks.

In the second main pass, the sections $a, a$, of the stock are laterally bent by the rolls 10 (Fig. 6) to a greater angle, as shown at $a^2$. Between pass 10 and pass 11 I provide guide rolls and guide elements, indicated as an entirety at 10', preferably substantially similar to like parts as shown in Fig. 5, for guiding the stock to the pass 11. In the third pass 11 (Fig. 7), the sections $a, a$, are laterally bent to the position shown at $a^3$ and the stock fed to the group of rolls between the pass 11 and pass 12. This roll group consists of two sets of rolls, each set comprising a plurality of outer rolls (preferably three rolls 22, 23, 24) for engaging one lateral section $a$ of the stock and inner rolls 25, one in opposed relation to each roll 22, 23, 24, the rolls 22, 23, 24 of each set operating to bend the adjacent section $a$ to the position shown at $a^4$. The rolls 22, 23, 24, 25 are mounted on inclined shafts 26 so as to properly engage the sections $a$ of the stock. The side wall of each roll 22 is inclined at an angle to its axis, whereas the side wall of each roll 23 is inclined at an angle to its axis less than that of the adjacent roll 22 and the side wall of each roll 24 is substantially parallel to its axis, whereby these rolls successively operate to bend the sections $a$ to the position shown at $a^4$, as they are fed by the rolls of the pass 11 to the rolls of pass 12 (Fig. 9). The rolls 25 engage the stock at the angles between the sections $a$ and section $a^x$, whereby the rolls 22, 23, 24, are effective to bend the sections $a$ to the position indicated.

The shafts for the rolls 22, 23, 24, are mounted in a support 27 having a base portion 28, whereas the shafts for the rolls 25 are mounted in a support 27' having a base portion 28'. Each base portion is formed with an elongated slot 29 and a bolt 30 extends through the slot and threads into a cross member 31 to secure the base portion thereto. Each cross member 31 is suitably secured to the adjacent standards 2. The slot 29 in each base portion permits the adjacent support to be adjusted transversely to the feed of the stock, whereby the adjacent rolls may be properly positioned. As shown, one set of rolls is supported on one cross member 31 above the stock so that the rolls of this latter set are mounted on the lower side of said member. Vertical adjustment of the rolls mounted on the upper cross member 31 is effected by providing shims between the cross member and adjacent base portions. Each support 27, 27' is engaged by one or more abutments 32 to resist lateral pressure due to the engagement of the adjacent rolls with the stock. The abutments 32 for each support 27' consist of screws threaded through openings formed in the support 27 for the adjacent rolls 22, 23 and 24. The abutments 32 for each support 27, consist of screws mounted in bars 33, which are suitably secure at their opposite ends to the sides of the adjacent standards 2, and threaded into openings formed in bosses 34 suitably fixed to the adjacent roll support.

The rolls of the pass 12 (Fig. 9) serves to feed the stock forwardly to a group of rolls indicated as an entirety at 35 and to the succeeding main pass 13 (Fig. 10) and also operate to set the sections $a, a, a^x$, in the angular relation to which they were bent by the sets of rolls 22, 23, 24, 25.

The group of rolls 35 is arranged between the passes 12 and 13 and comprise two sets of rolls constructed and mounted similarly to the sets of rolls 22, 23, 24, 25, except that the sets of rolls of the group 35 operate to bend the sections $a, a$, from the position shown at $a^4$ to the position shown at $a^5$.

The rolls of pass 13 (Fig. 10) serve to feed the stock to a group of rolls, indicated as an entirety at 36, arranged between the passes 13 and 14 and to the latter pass, and also operate to set the sections $a, a$, in the angular relation to which they were bent by the group of rolls 35. The group of rolls 36 comprise two sets of rolls constructed and mounted substantially similarly to the sets of rolls 22, 23, 24, 25, except that the sets of rolls of the group 36 operate to bend the sections $a, a$, from the position shown at $a^5$ to the position shown at $a^6$.

The rolls of pass 14 (Fig. 11) serve to feed the stock forwardly to a group of rolls, indicated as an entirety at 37, and to the succeeding main pass 15 (Fig. 15) and to set the sections $a, a, a^x$, in the angular relation to which they were bent by the group of rolls 36.

The group of rolls 37 may serve to bend the sections $a, a$, to an abnormal position or beyond their final position, as shown at $a^7$, following which the sections may be allowed to spring back to the final predetermined position, as shown at $a^8$. But by preference, the group of rolls 37 is arranged to effect two bending operations on the sections $a, a$, to wit, first to bend them to the position shown at $a^7$ and second to bend them in the reverse direction to their final position, shown at $a^8$, the purpose being to bend the stock sections at and along their contiguous portions between the sections $a—a^x$, $a—a^x$, beyond their final predetermined angular position and to then positively re-bend the sections $a, a$, back to their final position, whereby strains and stresses in these contiguous portions are eliminated and danger of deflection or distortion of the sections $a, a$, or twisting of the shape from end to end is avoided, irrespective of the variations in the thickness of the material, or varying conditions existent in the molecular structure of the material itself. By forcing the sections $a$ back to their final position it insures uniformity in the final shape of the stock. The group of rolls 37 comprise three sets of rolls, one set indicated as an entirety at 38 (Fig. 12), which serves to bend one section $a$ to the position shown at $a^7$, a second set indicated as an entirety at 39 (Fig. 13), which serves to bend the other section $a$ to the position shown at $a^7$, and a third set indicated as entirety at 40 (Fig. 14), which serves to bend the sections $a, a$, in the reverse direction to their predetermined final position $a^8$, preferably at right angles to the section $a^x$.

The set of rolls 38 consist of a guide roll 41, which engages the section $a^x$ of the stock, and two conically shaped rolls 42, 43, which engage the opposite faces of one section $a$ and co-operate with the roll 41 to bend the section to the position shown at $a^7$, as already set forth. The roll 43 loosely rotates on a shaft 43' mounted in a block 44, the latter being adjustably secured to the under side of the adjacent cross member 31 by a bolt 44' which extends through an elongated slot formed in the member 31, whereby the roll 43 may be adjusted transversely to the feed of the stock. The block 44 is formed with a threaded opening to receive a screw 45, rotatably mounted at its outer end in a bar 46, to serve as an abutment to resist lateral pressure, the abutment being locked to the block by a jam nut 45'. The bar 46 is suitably secured at its opposite ends to the adjacent standards 2. The roll 42 loosely rotates on a shaft 42' mounted on a block 47, which is adjustably supported between guides 48 provided on a base 49, the latter being bolted to the adjacent cross member 31. The block 47 is provided at its inner end with a depending arm 47' in which is suitably supported a shaft 50 for the roll 41. The block 47 is adjustable on the base 49 transversely to the direction of feed of the stock by means of a screw 51 rotatably mounted at its outer end in an end wall 52 and threaded into an opening formed in the block. 53 indicates an abutment to resist lateral pressure transmitted to the block. The abutment 53 consists of a screw threaded at its inner end through an opening formed in a boss on the block 47 and engaging the adjacent standard at its outer end. The adjustment of the rolls 42, 43, provides for their engagement with stock of different thicknesses. Vertical adjustment of the block 44 is provided for by means of a shim 44a between it and the adjacent cross member 31. The base 49 is preferably adjustably secured to the adjacent cross member 31 by bolts 49' extending through elongated openings formed therein.

The set of rolls 39 consist of a guide roll 54, which engages the section $a^x$ of the stock and two conically shaped rolls 55, 56, which engage the opposite faces of the other section $a$ and co-operate with the roll 54 to bend the section to the position shown at $a^7$, as above set forth. The roll 54 loosely rotates on a shaft 54' carried by a block 57 depending from and adjustably secured by a bolt 57' to the adjacent cross member 31, the bolt extending through an elongated slot so that the block 57 may be adjusted transversely to the direction of feed of the stock. The roll 55 loosely rotates on a shaft 55' carried by a block 58, which is adjustably supported between guides 59 provided on the base 49. The block 58 is adjusted transversely to the direction of feed of the stock relative to the roll 56 by means of a screw 60 rotatably mounted at its outer end in an end wall 61 provided on the base 49 and threaded at its inner end into an opening formed in the block. The roll 56 loosely rotates on a shaft 56' suitably supported in the base 49. The adjustment of the base 49 serves to effect adjustment of the roll 56 relative to the roll 54 and to insure alinement of the roll group 37 with the rolls of the adjacent main passes.

The set of rolls 40 consist of upper and lower pairs of rolls 62, 63, each pair of rolls being arranged to engage the opposite faces of one of the sections $a$. The rolls 62, 63, of each pair are mounted on vertical shafts 62', 63', respectively, their peripheries being preferably substantially parallel to their supporting shafts, so that they co-operate to bend the sections $a$ back to a predetermined position relative to the section $a^\times$, for example, at right angles thereto as shown in the disclosed form of construction. The rolls 62, 63 of each pair are preferably of different diameters and reversely arranged with respect to the rolls of the other pair, so that the outer side of each smaller roll need not extend unduly beyond the outer side of the larger roll of the other pair above or below it, thereby permitting assembly in minimum space. As shown, the larger rolls 62 are disposed in overlapping spaced relation so as to engage the opposite faces of the section $a^\times$ to guide it and permit the peripheries of the rolls of each pair to effect the reversely bending of the sections $a, a$, from the positions shown in Figs. 12 and 13 to that shown in Fig. 14, that is, to the predetermined position $a^8$.

Each roll 62, 63, is provided with a bushing to loosely rotate on their supporting shafts 62', 63', respectively. The shafts 62', 63' for the upper pair of rolls are suitably mounted in and depend from block 64 and are provided at their lower ends with nuts 65 engaging washers which engage the outer ends of the bushings to support the rolls on their shafts, the outer ends of the rolls being formed with recesses 66 to receive the nuts 65, whereby the pairs of rolls may be related to effect engagement of the opposed sides of the rolls 62 with the opposite faces of the section $a^\times$. Each block 64 is slidably mounted in ways 67 provided in a base member 68, which is suitably secured to the adjacent cross member 31. Adjustment of each block 64 transversely to the feed of the stock is effected by means of a screw 69 rotatably mounted at its outer end in an end wall 70 provided on the base member 68 and threaded at its inner end into an opening formed in the adjacent block.

The shafts 62', 63' for the lower pair of rolls are adjustably mounted on the adjacent cross member 31 similarly to the shafts for the upper pair of rolls.

The stock is fed to the main pass 15 (Fig. 15) the rolls of which operate to set the sections $a, a, a,^\times$, in their final angular relation into which they were bent by the set of rolls 40. The rolls 15 then feed the stock to and between a pair of guide rolls 71, 72, as shown in Fig. 16. The rolls 71, 72, overlap each other so as to engage the opposite faces of the section $a^\times$ and that their outer ends may engage the sections $a, a$, respectively. Each roll 71, 72 preferably loosely rotates on a shaft 73 supported in a block 74, the latter being slidably mounted in suitable transverse guides 74' provided in a bridge member 75, which is supported at its opposite ends on brackets 76 fixed to the adjacent standards 2. The block 74 which supports the shaft for the roll 72 is adjusted by means of a screw 77 rotatably supported at its outer end by an end wall 78 provided on the bridge member 75 and at its inner end the screw 77 is threaded into an opening formed in the adjacent block 74. Adjustment of the block 74 which supports the shaft for the roll 71 is provided for by means of a screw 79 threaded through an end wall 80 on the bridge member 75 and engaging the block at its inner end, the screw 79 being locked in adjusted position by a jam nut 81. Each block 74 is rigidly secured in adjusted position by one or more bolts 82, the openings in the bridge member or block being elongated to permit adjustment of the block on the bridge member transversely to the feed of the stock. The block 74 for the shaft for roll 71 is formed in sections to permit the insertion of a shim 83 between them, whereby the roll 71 may be adjusted vertically relative to the roll 72.

The shaped stock, after passing the guide rolls 71, 72, may be delivered to a suitable cut-off mechanism capable of cutting the stock into predetermined lengths, one form of cut-off mechanism suitable for carrying out this step of the process being shown in Figs. 1, 2 and 2$a$.

As already set forth, the herein disclosed machine and process may be adapted for forming stock having different cross sectional shapes, other than Z-shape. For example, channel shape, as shown at A' in Fig. 18 and by suitable roll passes, sections thereof may be corrugated transversely (Fig. 27) or longitudinally (Fig. 28) for reinforcing purposes dependent upon the use of the channel. Fig. 19 shows a channel A', one side wall of which is formed with a flange B, and portions thereof may be corrugated transversely (Fig. 29) or longitudinally (Fig. 30). Fig. 20 shows a stock formed into L-shape C, which may be corrugated transversely (Fig. 31) or longitudinally (Fig. 32). The L-shape C may be provided with a false bead $c$ and also corrugated transversely (Fig. 33) or longitudinally (Fig. 34). Where the stock is Z-shaped, it may be provided with a flange $c'$, as shown in Fig. 22. Fig. 22 shows Z-shaped stock D wherein one section is bent laterally along a longitudinal line $d$. The Z-shaped stock D may be corrugated transversely (Fig. 37) or longitudinally (Fig. 38). Fig. 24 shows L-shaped stock E having false beads $e$ along its opposite edges and either or both sections thereof may be corrugated transversely (Fig. 35) or longitudinally (Fig. 36). Fig. 25 shows U-shaped stock F having flanges of which are provided with false beads $f'$ rolled on top of the flanges (Fig. 25) or under them (Fig. 26); also the section of the U-shaped stock F may be corrugated transversely (Fig. 39) or longitudinally (Fig. 40).

Figs. 41 and 42 show members of generally U-shape or channel shape in cross section, each provided with flanges $f$, the marginal portions of which are rolled back therein as shown at $f^2$ to form guides for similarly shaped flanges on adjoining members. In this arrangement the guides along the opposite sides of one member telescopically fit the guides of adjoining members, whereby a plurality of members may be connected together to form a wall and thus be used as sheet piling, as shown in Fig. 42. In this application of the U-members the sections $a$, $a$, $a^×$, thereof are reinforced by longitudinally extending corrugations. The corrugations and rolled-over portions may be formed by suitable roll passes.

When found desirable the rolls of one or more of the main passes may be constructed to provide the shaped stock with sharply defined corners. One form of roll construction suitable for this purpose is shown in Fig. 43 and consists in providing a separate pass or the rolls of one or more main passes with complementary, angularly related shaping portions 84, 85 (having sharply defined corners 84' and 85', for engaging the sections $a$, $a$, $a^×$), and active face portions 86, which are disposed at right angles to the sections $a$, $a$, and which serve to exert pressure on these sections in their planes, so that the metal at the angles between the sections is forced into engagement with the angularly related shaping portions 84, 85, of the rolls contiguous to the corners 84', 85', whereby the stock is correspondingly shaped. In the forms of construction shown in Figs. 44, 45 and 46 I provide for the forming of a sharply defined corner on the inner side of two related wall sections (such as $a$, $a^×$). In these forms of construction I form along the line on which the sections are bent a groove B, which may be formed by a rib $b$ on the lower feeding roll 8 (Fig. 44) or the lower roll of a separate pass or of one of the main passes (Fig. 46), so that when the section $a$ is set in final position, as by the rolls of pass 15, the groove permits the portions of the metal along the opposite sides thereof to be forced together and angularly disposed. In the forms of construction shown in Figs. 47, 48 and 49, I provide for the forming of a sharply defined corner on the inner side of two related wall sections and also a substantially sharply defined corner along the outer side of these sections.

To produce these results, I emboss or off-set along the line on which the sections $a$, $a×$, are bent a portion of the metal, which forms a groove B' on one side of the stock and a rib G on the other side thereof. The groove B' is formed by providing a rib $b'$ on the lower feeding roll 8 (Fig. 47) or the lower roll of a separate pass or of one of the main passes (Fig. 49) and the rib C is provided by forming a groove $c$ on the adjacent upper roll, so that when the section $a$ is set in final position, as by the roll pass 15, the inner and outer corners are sharply defined, as shown.

Figs. 50 to 67, inclusive, illustrate the successive steps of forming an I-member from sheet metal or sheet steel, as shown in Fig. 69, the stock A being fed by driven feed rolls 87 to the first main roll pass 88. Figs. 50 to 64 of these views illustrate the shaping of one end portion only of the stock, it being understood that the other end portion thereof is correspondingly shaped at each pass. The stock is fed to the succeeding passes 89, 90, 91, to form the end section $d$ and flanges $e$, then to passes 92, 93, which act on the outer flange $h$, then to intermediate roll passes 94, 95, to partially form the bead $g$, then to roll pass 96 which gives a set to the inner flange portion $h'$, then to roll pass 97 and an auxiliary roll 97' associated therewith to set the outer flange $h$ and the contiguous bead $g$. The stock then feeds to pass 98, which further bends over the bead $g$ at $g'$, then to pass 100 having an auxiliary roll 100' which acts to bend the outer flange $h$ into engagement with the end section $d$, then to passes 101, 102, 103, which form the bead $g^2$ between the inner flange $h'$ and end section $d$. The stock then feeds to pairs of bending rolls 104, 104' (Fig. 66), having related active faces inclined to the axes of the rolls, which faces engage the inner flanges $h'$ and end sections $d$ to bend the stock along the lines $x$ beyond its final predetermined position and then to succeeding pairs of rolls 105, 105' (Fig. 67), having active faces parallel to the axes of the rolls, which faces engage the inner flanges $h'$ and end sections $d$ to re-bend the stock along the lines $x$ to its final or predetermined position. The stock A then feeds between a pair of guide rolls 106 (Fig. 68) which engage the end sections $d$ to guide the stock to the pass 107 (the rolls 106 being positioned between the pairs of rolls 105, 105', and the roll pass 107, that is, in front of the latter pass). The rolls of pass 107 are provided with grooves 107' the walls of which engage the beads $g$ to give a final set thereto.

Where the shaped stock is to be reinforced transversely, it is fed between guide rolls 108 to a pair of driven rolls 109 which are provided on their peripheries with complementary corrugations 109' which corrugate the web portion of the I-member and marginal portions of the flanges $h$, $h'$, as shown in Fig. 70. As will be understood, the guide rolls 108 are mounted in front of the corrugating rolls 109. Where the shaped stock is to be reinforced longitudinally, the guide rolls 108 guide the shaped stock to rolls 110 (Fig. 75) having on their peripheries annular corrugations which co-act to corrugate the web of the I-member, as shown in Fig. 74.

By providing rolls having cooperating forming or shaping elements at one end, a T-member, as shown in Fig. 69a, may be formed.

It will be understood that the rolls of passes 87 to 107, inclusive, as well as the corrugating rolls 109, 110 may be mounted and driven similarly to the rolls of passes 8, 9, 10, 11, 12, 13, 14 and 15.

The cut-off mechanism, indicated as an entirety at 111, may be of any desired construction, but is preferably arranged so as to engage the shaped stock as it leaves the guide rolls 71, 72, and is drivingly connected to the shaft 7', whereby its operation is synchronized with the feed of of the material, by a shaft 112. The cut-off mechanism includes a housing 113 in which is provided suitable operating means for reciprocating a slide 114 guided on the top wall of the housing. The slide 114 carries an electric motor 115, the shaft of which is provided with a sprocket for a chain 116. The belt 116 drives a sprocket on one end of a countershaft 117 mounted in a sleeve 118, which is supported by and rigidly secured to a pair of arms 119, the arms being mounted to swing on the end walls of the motor casing about the axis of the motor shaft. 120 indicates a saw mounted on the other end of the countershaft 117 and adapted to engage the shaped stock when the arms are swung laterally or transversely to the feed of the stock. The arms are held in one position by a spring 121, but by means of an arm 122 engaging a cam 123, the arms are swung laterally to effect engagement of the saw 120 with the stock to cut the latter. The slide 114 is operated in co-operative relation with the feed of the stock, so that the saw 120 will engage therewith when a predetermined length of the stock feeds relative to the saw whereby the stock is cut into uniform predetermined lengths. The operation of the slide 114 is controlled by the driving means within the housing 113. As the construction of cut-off mechanism does not form a part of the present invention, the slide operating means are not illustrated. For a more complete illustration and description of the cut-off mechanism, reference may be made to my co-pending application Serial No. 736,628, filed July 24, 1934, now Patent No. 2,098,989, dated November 11, 1937.

It will be noted that the rolls of each pass and group may be adjusted relative to each other to accommodate stock of different thicknesses or sections of stock of different widths and that the rolls of each pass and group may be removed and others substituted to act on stock of different widths and according to the cross sectional shape of the stock to be produced.

From the foregoing description it will also be noted that I am enabled to form structural shapes or members of any predetermined cross sectional contour dependent upon the intended specific application thereof, that such members are formed rapidly and from stock which insures strength and minimum weight, and that by bending the sections of the material to an abnormal position and back to its final position, uniformity of shape is attained irrespective of variations in the thickness of the metal or other imperfections in the material.

To those skilled in the art to which my invention relates, many changes in construction and widely differing embodiments and applications of the invention will be apparent without departing from the spirit and scope thereof. My disclosures and the description herein are purely illustrative and are not intended to be in any sense limiting.

What I claim is:

1. The herein disclosed process of shaping sheet metal to form structural members having a predetermined cross sectional shape which consists in feeding sheet metal stock to and through a plurality of roll passes and bending a section of the stock along a longitudinal line to approximately its final predetermined position, then bending the section along said line to an abnormal position beyond the final predetermined position thereof, and finally bending the section along said line in the reverse direction to its final predetermined position.

2. The herein disclosed process of shaping sheet metal to form structural members having a predetermined cross sectional shape which consists in feeding sheet metal stock of indefinite length to and through a plurality of roll passes for continuously bending the stock according to the following steps, namely, bending a section of the stock along a longitudinal line to approximately its final predetermined position, then bending the section along said line to an abnormal position beyond the final predetermined position thereof, and finally bending the section along said line in the reverse direction to its final predetermined position.

3. The herein disclosed process of shaping sheet metal to form structural members which consists in feeding the sheet metal stock to a plurality of roll passes to bend portions of the stock along longitudinal lines to form an end section and inner and outer flanges in angular relation to each other and the remaining portion of the sheet metal stock, then bending the flanges and end section along said lines to position the flanges in substantial engagement with the end section, then bending the end section and flanges along the longitudinal line of bend between the inner flange and the contiguous portion of the material to a position beyond their final position, and finally bending the end section and flanges along said line back to their final position.

4. In a machine of the class described, the combination of means for feeding sheet material, a series of roll passes operating to bend a section of the material relative to another section thereof, along a longitudinal line into angular relation to a position approximating their final position, a group of rolls for bending one section relative to the other section to a position beyond its final position, and a group of rolls for bending the section in the reverse direction backwardly to its final position.

5. In a machine of the class described, the combination of a plurality of passes having driven rolls, means for feeding sheet material to said passes, the forward passes operating to preliminarily bend laterally a section of the material, groups of rolls between certain of the remaining rolls for further laterally bending the section, a roll pass following each group of bending rolls operating to set the material in the position bent by said group of rolls, a group of rolls for bending the section beyond its predetermined position, and means for bending the section backwardly into its final position.

6. In a machine of the class described, the combination of means for feeding sheet material, a series of roll passes operating to bend a section of the material relative to its remaining portion along a longitudinal line into angular relation to a position approximating its final position, a group of rolls for bending the laterally bent section along its line of bend to a position beyond its final position, said rolls comprising a roller engaging a face of the material and a pair of co-acting conical rollers engaging the laterally bent section and co-operating with the first mentioned roller, and a group of rolls for setting the section in its final position.

7. In a machine of the class described, the combination of means for feeding sheet material, a series of roll passes for bending on longitudinal lines the lateral section of the material into angular relation to the main portion thereof and the lateral section into angularly related portions, one roll of certain of said roll passes having a wall abutting the outer surface of the angle between two of said portions and preventing outward flow of metal in the angle as the two portions are moved angularly toward each other, and rolls for bending the angularly related portions into face to face relation and at substantially right angles to the main portion of the material.

CARL M. YODER.